United States Patent
Pehlke et al.

(10) Patent No.: US 12,489,188 B2
(45) Date of Patent: Dec. 2, 2025

(54) TUNABLE CAVITY WAVEGUIDE

(71) Applicant: Skyworks Solutions, Inc., Irvine, CA (US)

(72) Inventors: David Richard Pehlke, Westlake Village, CA (US); Joshua James Caron, Summerfield, NC (US)

(73) Assignee: Skyworks Solutions, Inc., Irvine, CA (US)

( * ) Notice: Subject to any disclaimer, the term of this patent is extended or adjusted under 35 U.S.C. 154(b) by 547 days.

(21) Appl. No.: 18/069,449

(22) Filed: Dec. 21, 2022

(65) Prior Publication Data

US 2023/0208002 A1 Jun. 29, 2023

Related U.S. Application Data

(60) Provisional application No. 63/266,088, filed on Dec. 28, 2021.

(51) Int. Cl.
  *H01P 3/12* (2006.01)
  *H01P 1/08* (2006.01)
  *H01Q 9/04* (2006.01)
  *H04B 1/00* (2006.01)

(52) U.S. Cl.
  CPC .............. *H01P 3/12* (2013.01); *H01P 1/08* (2013.01); *H01Q 9/0407* (2013.01); *H04B 1/0064* (2013.01)

(58) Field of Classification Search
  CPC .......... H01P 3/12; H01P 1/08; H01Q 9/0407; H04B 1/0064
  See application file for complete search history.

(56) References Cited

U.S. PATENT DOCUMENTS

| | | |
|---|---|---|
| 3,720,953 A | 3/1973 | Ajioka |
| 3,774,223 A | 11/1973 | Ehrenspeck et al. |
| 4,028,521 A | 6/1977 | Uyeda et al. |
| 4,415,900 A | 11/1983 | Kaloi |
| 4,821,041 A | 4/1989 | Evans |
| 4,872,211 A | 10/1989 | Chen |
| 6,809,696 B1 | 10/2004 | Bergmark et al. |
| 8,525,616 B1 | 9/2013 | Shaw et al. |
| 9,386,688 B2 * | 7/2016 | MacDonald ......... H01Q 9/0407 |
| 9,564,938 B1 | 2/2017 | Wang |
| 10,170,839 B2 | 1/2019 | Xue et al. |
| 10,177,451 B1 | 1/2019 | Baraban et al. |
| 10,333,226 B2 | 6/2019 | Hill et al. |
| 10,347,961 B2 | 7/2019 | Wargo et al. |
| 10,879,616 B2 | 12/2020 | Cheng et al. |
| 10,923,831 B2 | 2/2021 | Rogers |

(Continued)

*Primary Examiner* — David Bilodeau
(74) *Attorney, Agent, or Firm* — Knobbe, Martens, Olson and Bear, LLP

(57) ABSTRACT

Tunable cavity waveguides are disclosed. In certain embodiments, a tunable cavity waveguide includes a controllable tunnel structure including a signal feed configured to receive a millimeter wave signal, and a plurality of controllable tunnel walls providing a waveguide for the millimeter wave signal. The unable cavity waveguide further includes a control circuit configured to control the waveguide by individually setting each of the plurality of controllable tunnel walls in a blocking state in which the millimeter wave signal is blocked or a transparent state in which the millimeter wave signal is passed.

20 Claims, 13 Drawing Sheets

(56) References Cited

U.S. PATENT DOCUMENTS

| | | |
|---|---|---|
| 10,938,082 B2 | 3/2021 | Rogers |
| 10,992,059 B2 | 4/2021 | Zhu et al. |
| 11,005,185 B2 | 5/2021 | Howarth et al. |
| 11,018,719 B2 | 5/2021 | Sarabandi et al. |
| 11,043,727 B2 | 6/2021 | Salem et al. |
| 11,056,754 B2 | 7/2021 | Mai et al. |
| 11,069,965 B2 | 7/2021 | Wang et al. |
| 11,121,472 B2 * | 9/2021 | Zhao .................... H01Q 13/106 |
| 11,122,653 B2 | 9/2021 | Roumpedaki et al. |
| 11,133,594 B2 | 9/2021 | Ahmadloo |
| 11,133,602 B2 | 9/2021 | Pernstal et al. |
| 11,139,582 B2 | 10/2021 | Flemming et al. |
| 11,189,935 B2 | 11/2021 | Hamminga et al. |
| 11,239,546 B2 | 2/2022 | Zhao et al. |
| 11,450,958 B2 | 9/2022 | Liang et al. |
| 11,515,636 B2 | 11/2022 | Zhao et al. |
| 11,545,741 B2 | 1/2023 | Zhao et al. |
| 11,552,402 B2 | 1/2023 | Edwards et al. |
| 2007/0216594 A1 | 9/2007 | Uno et al. |
| 2008/0048922 A1 | 2/2008 | Haziza |
| 2009/0009391 A1 | 1/2009 | Fox et al. |
| 2009/0284415 A1 | 11/2009 | Worl et al. |
| 2016/0036131 A1 | 2/2016 | Kim |
| 2017/0133756 A1 * | 5/2017 | Eastburg ................ H01Q 1/521 |
| 2019/0267690 A1 * | 8/2019 | Vaughn ................... H01P 1/182 |
| 2019/0348749 A1 * | 11/2019 | Thai ..................... H01Q 9/0414 |
| 2021/0328348 A1 * | 10/2021 | Kim ....................... H01Q 21/08 |
| 2022/0006185 A1 | 1/2022 | Yetisir |
| 2022/0006198 A1 | 1/2022 | Edwards et al. |
| 2022/0085516 A1 | 3/2022 | Hamminga et al. |
| 2022/0102873 A1 | 3/2022 | Wang et al. |
| 2023/0216192 A1 | 7/2023 | Pehlke et al. |

* cited by examiner

TUNABLE CAVITY WAVEGUIDE

CROSS-REFERENCE TO RELATED APPLICATIONS

This application claims the benefit of priority under 35 U.S.C. § 119 of U.S. Provisional Patent Application No. 63/266,088, filed Dec. 28, 2021 and titled "TUNABLE CAVITY WAVEGUIDE," which is herein incorporated by reference in its entirety.

BACKGROUND

Field

Embodiments of the invention relate to electronic systems, and in particular, to waveguides for radio frequency (RF) electronics.

Description of the Related Technology

Waveguides are used in radio frequency (RF) communication systems to guide RF signals from a signal source (for example, the output of an RF amplifier) to a signal destination (for example, a load such as an antenna).

Examples of RF communication systems with one or more waveguides include, but are not limited to mobile phones, tablets, base stations, network access points, laptops, and wearable electronics. RF signals have a frequency in the range from about 30 kHz to 300 GHz, for instance, in the range of about 400 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

SUMMARY

In certain embodiments, the present disclosure relates to a mobile device. The mobile device includes an antenna, and a front end system including a radio frequency circuit configured to generate a millimeter wave signal, a controllable tunnel structure having a signal feed configured to receive the millimeter wave signal, and a plurality of controllable tunnel walls providing a waveguide for the millimeter wave signal to the antenna. The front end system further includes a control circuit configured to control the waveguide by individually setting each of the plurality of controllable tunnel walls in a blocking state in which the millimeter wave signal is blocked or a transparent state in which the millimeter wave signal is passed.

In some embodiments, the plurality of controllable tunnel walls includes a first controllable tunnel wall on a first side of the signal feed, a second controllable tunnel wall on a second side of the signal feed, a third controllable tunnel wall on a third side of the signal feed, and a fourth controllable tunnel wall on a fourth side of the signal feed. According to a number of embodiments, the control circuit is configured to set the first controllable tunnel wall to the transparent state. In accordance with several embodiments, the control circuit is further configured to set the second controllable tunable wall, the third controllable tunnel wall, and the fourth controllable tunnel wall to the blocking state.

In various embodiments, the radio frequency circuit includes a power amplifier configured to provide the millimeter wave signal at an output.

In several embodiments, the millimeter wave signal is in frequency range two of fifth generation.

In some embodiments, the mobile device further includes a substrate to which the antenna is attached. According to a number of embodiments, the mobile device further includes a semiconductor die attached to the substrate, the semiconductor die including the radio frequency circuit and the control circuit. In accordance with several embodiments, the antenna is an edge-fired antenna formed on an edge of the substrate. According to various embodiments, the antenna is a patch antenna formed on a major surface of the substrate.

In several embodiments, the mobile device further includes an antenna array operable to radiate a transmit beam, the antenna array including the antenna.

In certain embodiments, the present disclosure relates to a tunable cavity waveguide. The tunable cavity waveguide includes a controllable tunnel structure including a signal feed configured to receive a millimeter wave signal, and a plurality of controllable tunnel walls providing a waveguide for the millimeter wave signal. The tunable cavity waveguide further includes a control circuit configured to control the waveguide by individually setting each of the plurality of controllable tunnel walls in a blocking state in which the millimeter wave signal is blocked or a transparent state in which the millimeter wave signal is passed.

In some embodiments, the plurality of controllable tunnel walls includes a first controllable tunnel wall on a first side of the signal feed, a second controllable tunnel wall on a second side of the signal feed, a third controllable tunnel wall on a third side of the signal feed, and a fourth controllable tunnel wall on a fourth side of the signal feed.

In various embodiments, the controllable tunnel structure is integrated with an edge-fired antenna.

In a number of embodiments, the millimeter wave signal is in frequency range two of fifth generation.

In certain embodiments, the present disclosure relates to a method of signal transmission in a mobile device. The method includes generating a millimeter wave signal using a radio frequency circuit, providing the millimeter wave signal to a signal feed of a controllable tunnel structure, and providing a wave guide from the signal feed to the antenna through the controllable tunnel structure by individually setting each of the plurality of controllable tunnel walls in a blocking state in which the millimeter wave signal is blocked or a transparent state in which the millimeter wave signal is passed.

In various embodiments, the plurality of controllable tunnel walls includes a first controllable tunnel wall on a first side of the signal feed, a second controllable tunnel wall on a second side of the signal feed, a third controllable tunnel wall on a third side of the signal feed, and a fourth controllable tunnel wall on a fourth side of the signal feed, the method further comprising setting the first controllable tunnel wall to the transparent state. According to a number of embodiments, the method further includes setting the second controllable tunable wall, the third controllable tunnel wall, and the fourth controllable tunnel wall to the blocking state.

In several embodiments, the method further includes providing the millimeter wave signal at an output of a power amplifier.

In a number of embodiments, the method further includes radiating a transmit beam from an edge-fired antenna array formed on an edge of a substrate, the edge-fired antenna array including the antenna.

DETAILED DESCRIPTION OF EMBODIMENTS

Figure 1:
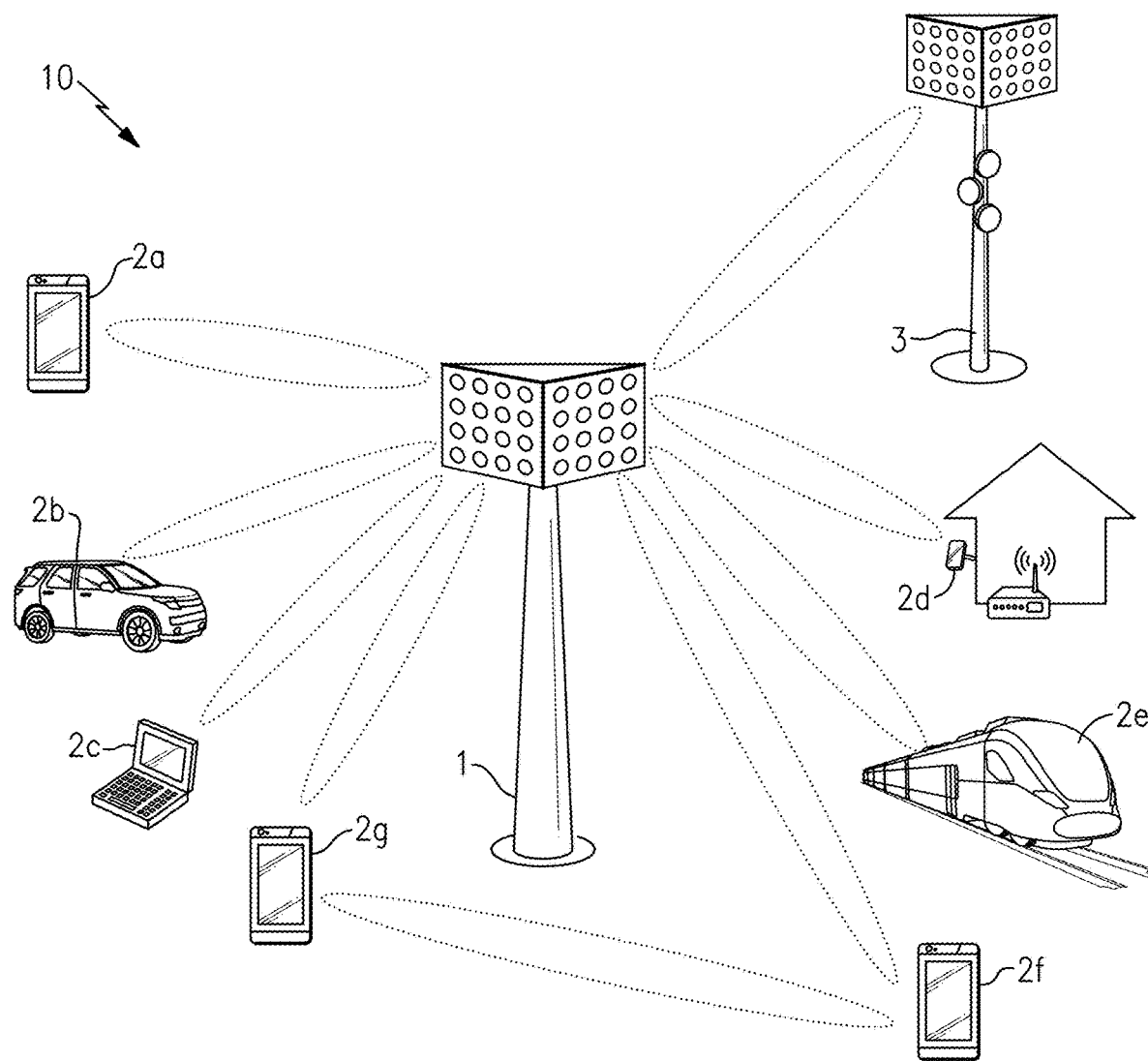
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 20.

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands which include 5G FR2. Thus, as used herein a millimeter wave signal can include traditional millimeter waves (30 GHz to 300 GHz) as well as upper centimeter wave frequencies in the range of 24 GHz to 30 GHz. Cellular user equipment can communicate using beamforming and/or other techniques over a wide range of frequencies, including, for example, FR2-1 (24 GHz to 52 GHz), FR2-2 (52 GHz to 71 GHz), and/or FR1 (400 MHz to 7125 MHz).

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
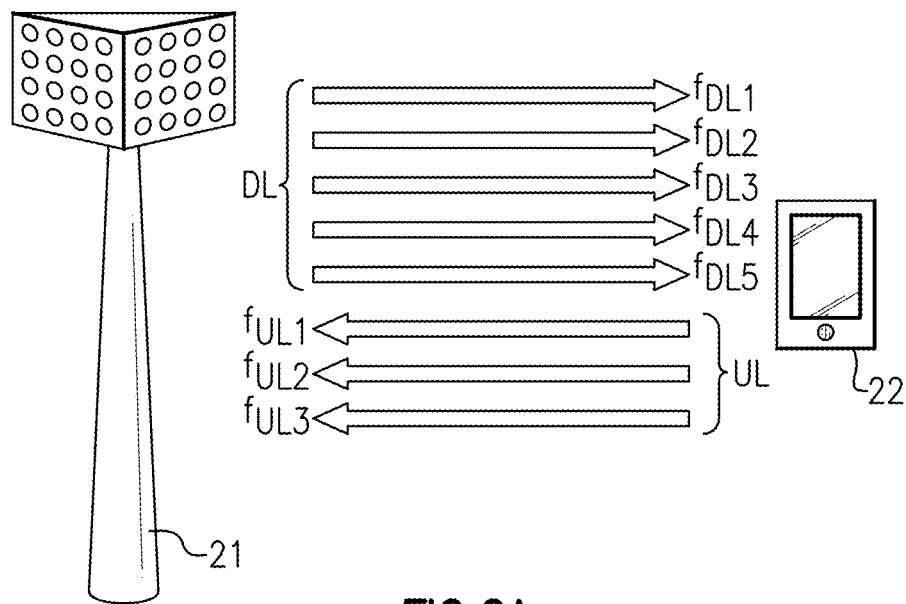
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
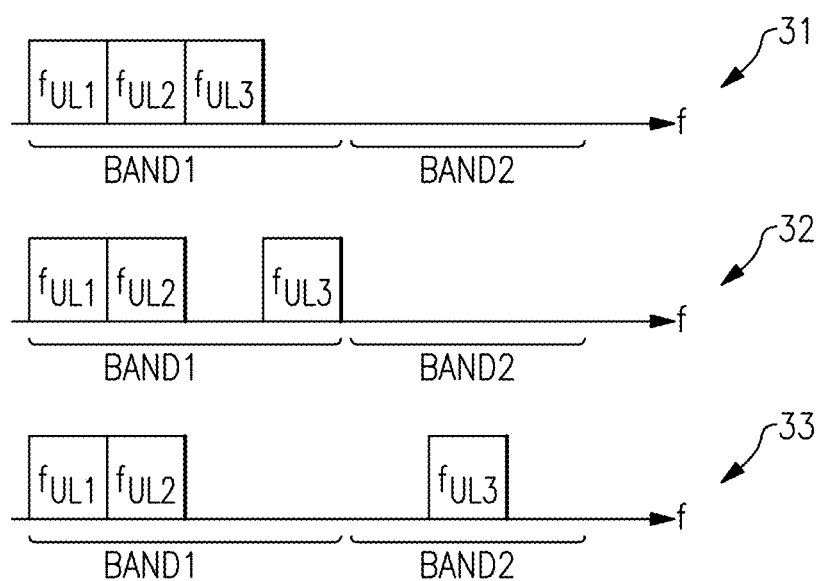
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
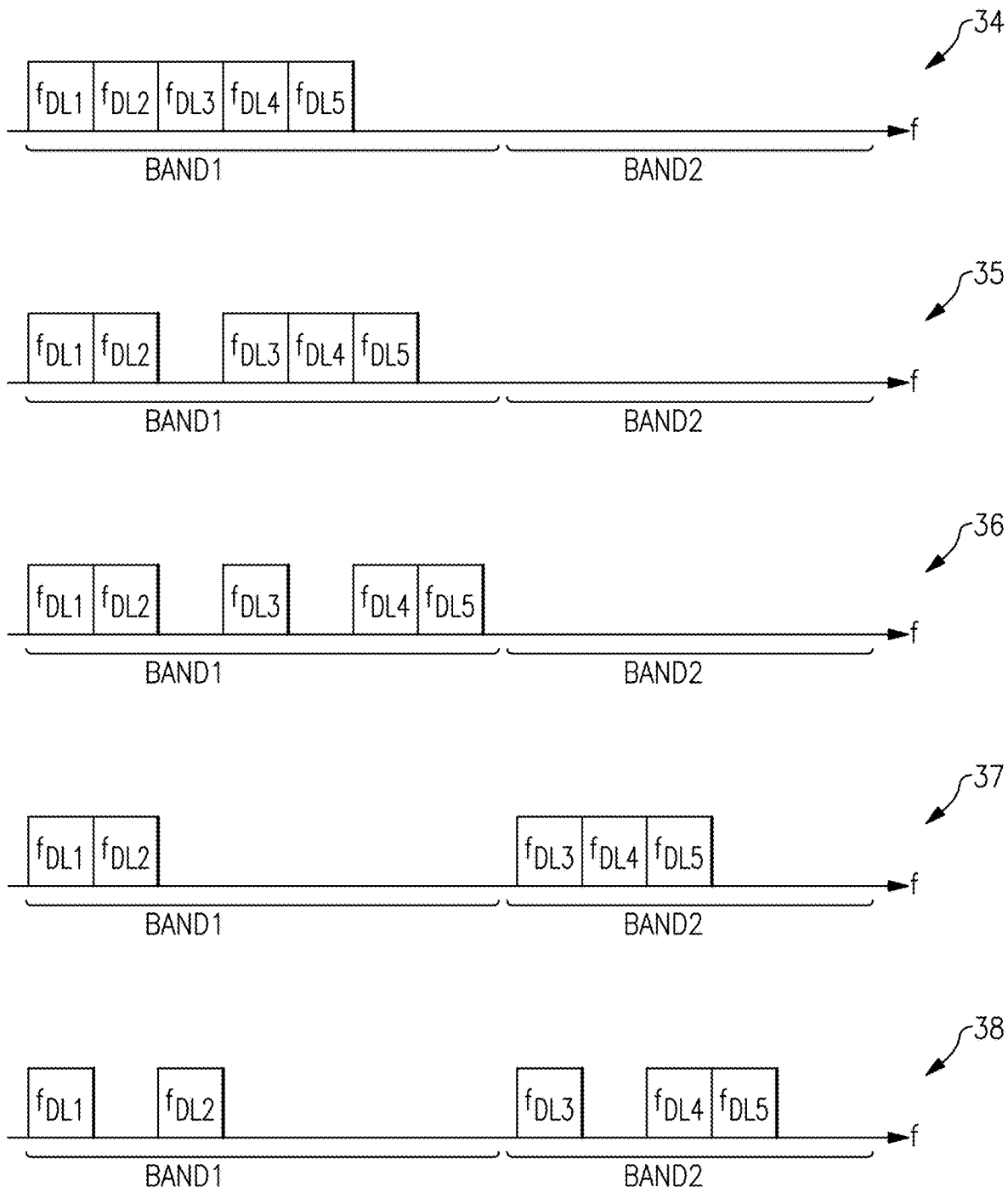
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink. Furthermore, NR-U can operate on top of LAA/eLAA over a 5 GHz band (5150 to 5925 MHz) and/or a 6 GHz band (5925 MHz to 7125 MHz).

Figure 3A:
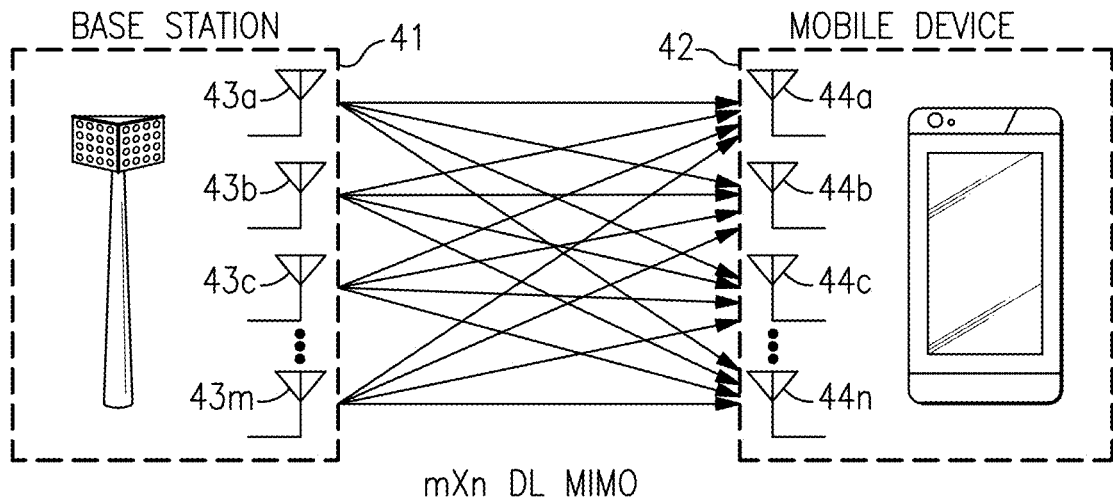
FIG. 3A is a schematic diagram of one example of a downlink channel using multi-input and multi-output (MIMO) communications.
Figure 3B:
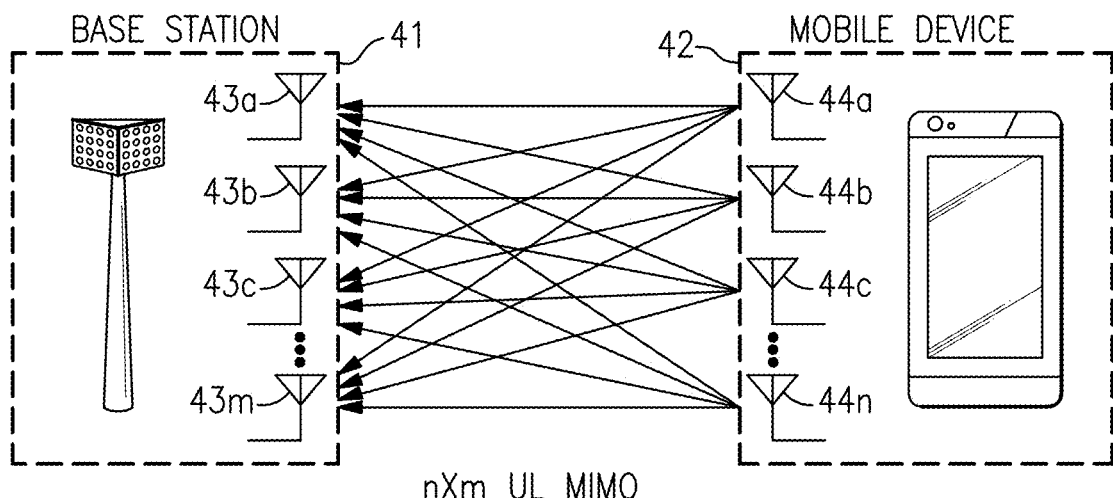
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
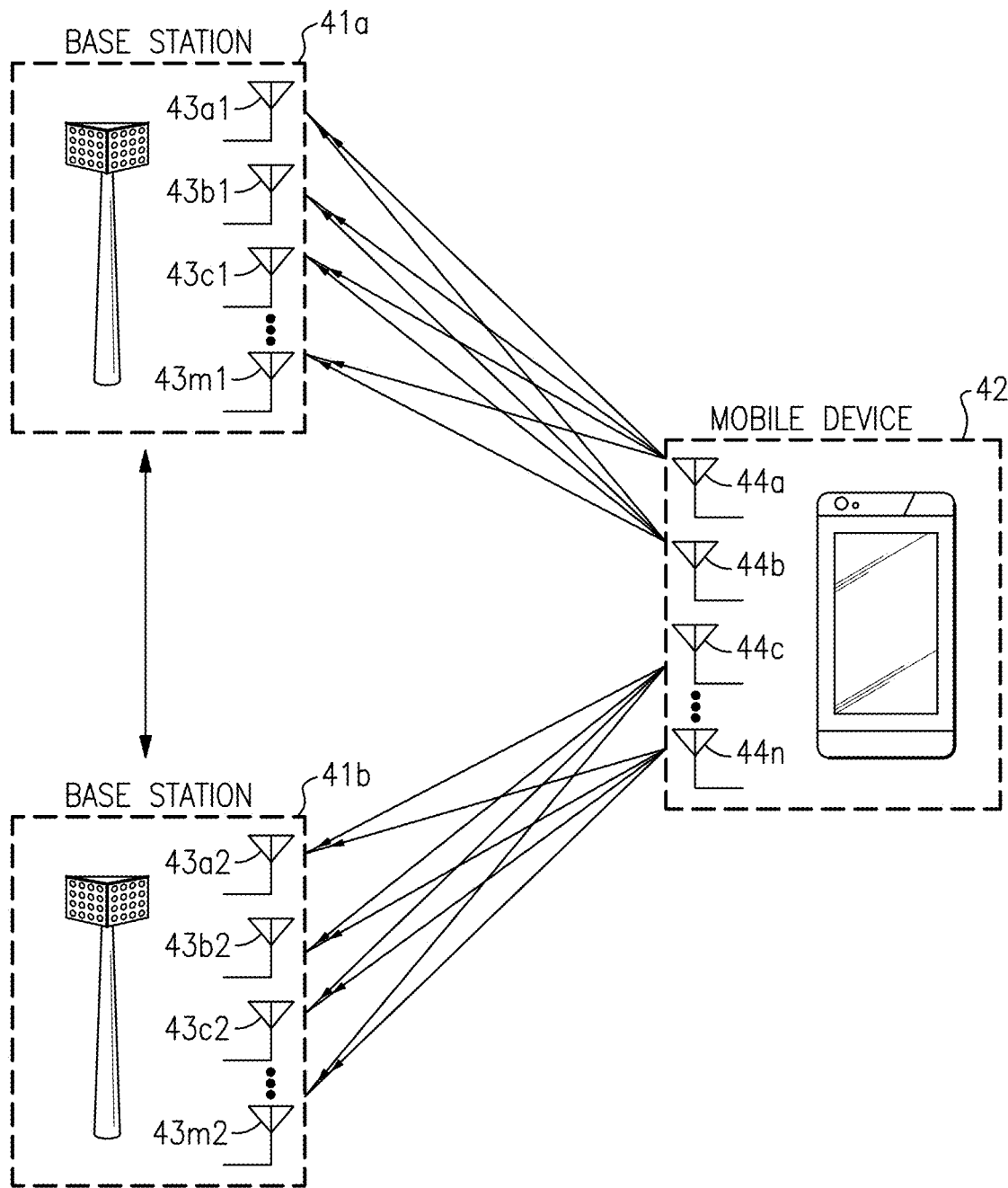
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, . . . 44n of the mobile device 42. Additional a first portion of the uplink transmissions are received using M antennas 43a1, 43b1, 43c1, 43m1 of a first base station 41a, while a second portion of the uplink transmissions are received using M antennas 43a2, 43b2, 43c2, 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

Figure 4A:
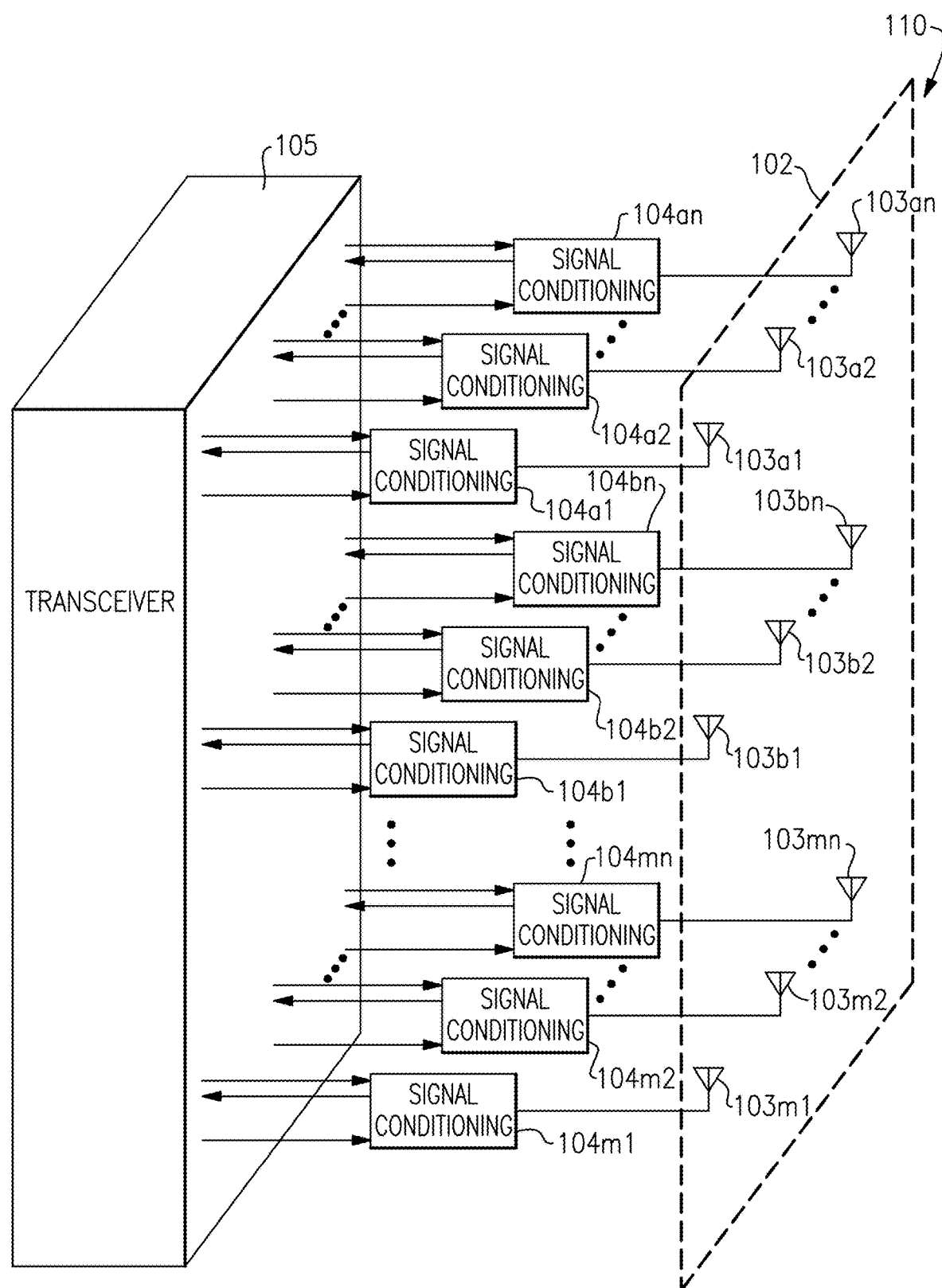
FIG. 4A is a schematic diagram of one example of a communication system that operates with beamforming.

FIG. 4A is a schematic diagram of one example of a communication system 110 that operates with beamforming. The communication system 110 includes a transceiver 105, signal conditioning circuits 104a1, 104a2 . . . 104an, 104b1, 104b2 . . . 104bn, 104m1, 104m2 . . . 104mn, and an antenna array 102 that includes antenna elements 103a1, 103a2 . . . 103an, 103b1, 103b2 . . . 103bn, 103m1, 103m2 . . . 103mn.

Communications systems that communicate using millimeter wave carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 4A, the transceiver 105 generates control signals for the signal conditioning circuits. The control signals can be used for a variety of functions, such as controlling the gain and phase of transmitted and/or received signals to control beamforming.

Figure 4B:
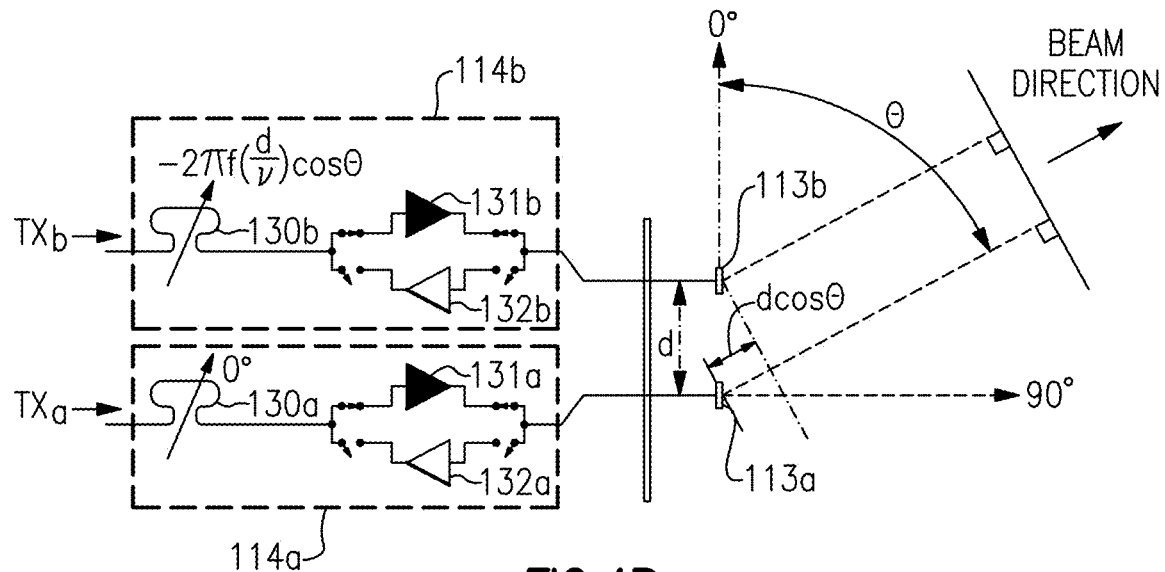
FIG. 4B is a schematic diagram of one example of beamforming to provide a transmit beam.

FIG. 4B is a schematic diagram of one example of beamforming to provide a transmit beam. FIG. 4B illustrates a portion of a communication system including a first signal conditioning circuit 114a, a second signal conditioning circuit 114b, a first antenna element 113a, and a second antenna element 113b.

Although illustrated as included two antenna elements and two signal conditioning circuits, a communication system can include additional antenna elements and/or signal conditioning circuits. For example, FIG. 4B illustrates one embodiment of a portion of the communication system 110 of FIG. 4A.

The first signal conditioning circuit 114a includes a first phase shifter 130a, a first power amplifier 131a, a first low noise amplifier (LNA) 132a, and switches for controlling selection of the power amplifier 131a or LNA 132a. Additionally, the second signal conditioning circuit 114b includes a second phase shifter 130b, a second power amplifier 131b, a second LNA 132b, and switches for controlling selection of the power amplifier 131b or LNA 132b.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113a and the second antenna element 113b are separated by a distance d. Additionally, FIG. 4B has been annotated with an angle θ, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113a, 113b, a desired transmit beam angle θ can be achieved. For example, when the first phase shifter 130a has a reference value of 0°, the second phase shifter 130b can be controlled to provide a phase shift of about $-2\pi f(d/v)\cos\theta$ radians, where f is the fundamental frequency of the transmit signal, d is the distance between the antenna elements, v is the velocity of the radiated wave, and π is the mathematic constant pi.

In certain implementations, the distance d is implemented to be about ½λ, where λ is the wavelength of the fundamental component of the transmit signal. In such implementations, the second phase shifter 130b can be controlled to provide a phase shift of about $-\pi\cos\theta$ radians to achieve a transmit beam angle θ.

Accordingly, the relative phase of the phase shifters 130a, 130b can be controlled to provide transmit beamforming. In certain implementations, a baseband processor and/or a transceiver (for example, the transceiver 105 of FIG. 4A) controls phase values of one or more phase shifters and gain values of one or more controllable amplifiers to control beamforming.

Figure 4C:
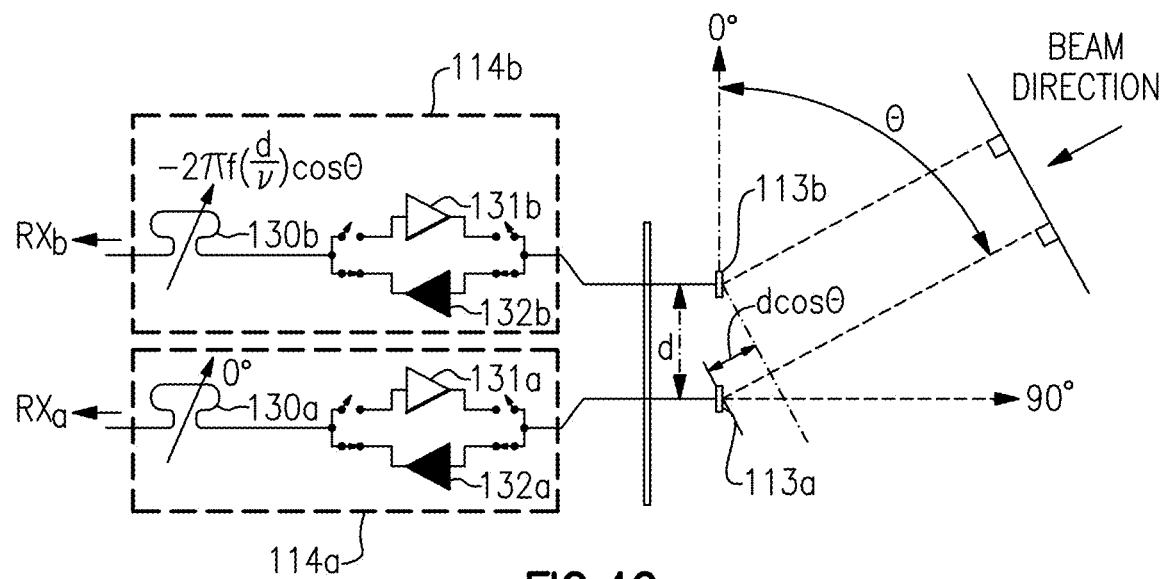
FIG. 4C is a schematic diagram of one example of beamforming to provide a receive beam.

FIG. 4C is a schematic diagram of one example of beamforming to provide a receive beam. FIG. 4C is similar to FIG. 4B, except that FIG. 4C illustrates beamforming in the context of a receive beam rather than a transmit beam.

As shown in FIG. 4C, a relative phase difference between the first phase shifter 130a and the second phase shifter 130b can be selected to about equal to $-2\pi f(d/v)\cos\theta$ radians to achieve a desired receive beam angle θ. In implementations in which the distance d corresponds to about ½λ, the phase difference can be selected to about equal to $-\pi\cos\theta$ radians to achieve a receive beam angle θ.

Although various equations for phase values to provide beamforming have been provided, other phase selection values are possible, such as phase values selected based on implementation of an antenna array, implementation of signal conditioning circuits, and/or a radio environment.

Figure 5A:
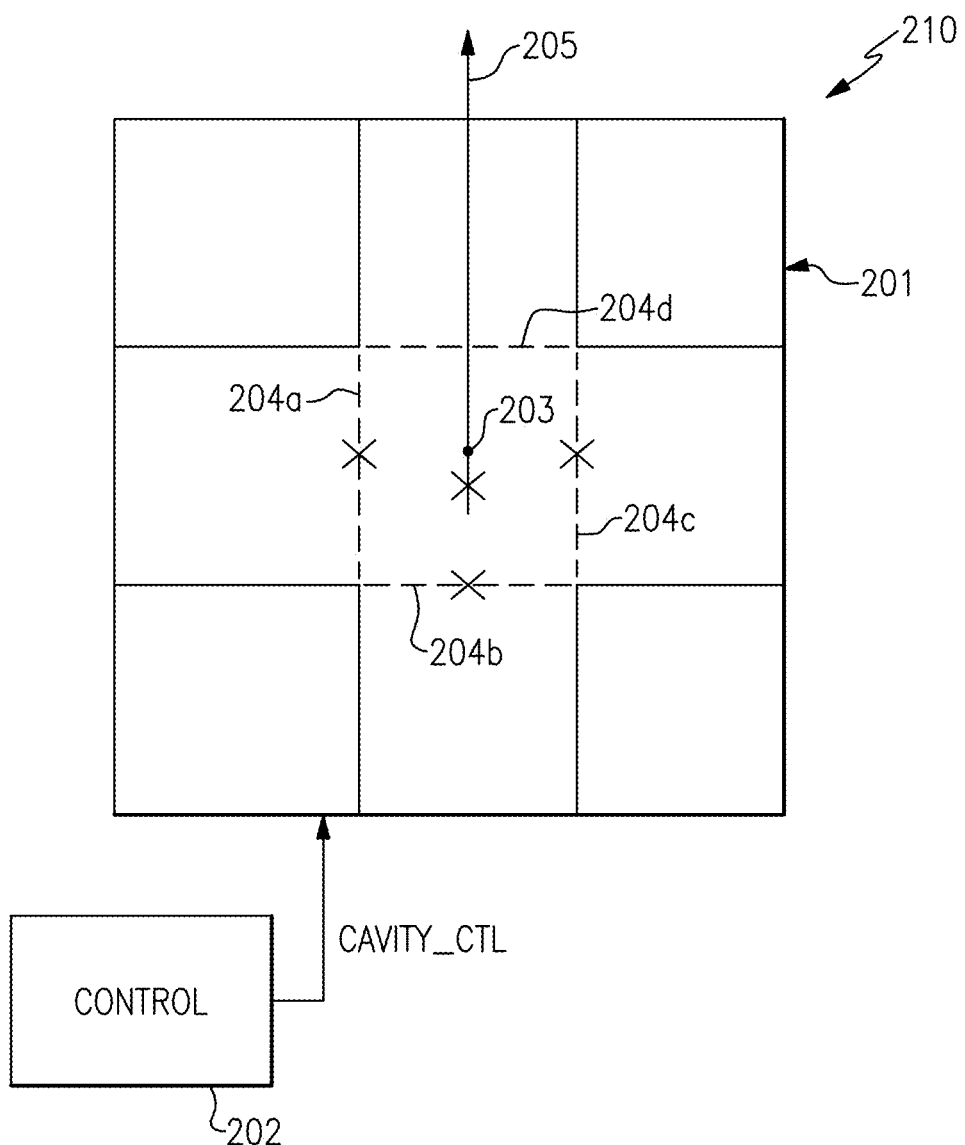
FIG. 5A is a schematic diagram of a tunable cavity waveguide according to one embodiment.

FIG. 5A is a schematic diagram of a tunable cavity waveguide 210 according to one embodiment. The tunable cavity waveguide 210 includes a controllable tunnel structure 201 and a control circuit 202.

As shown in FIG. 5A, the controllable tunnel structure 201 includes a plurality of controllable tunnel walls, including a first controllable tunnel wall 204a, a second controllable tunnel wall 204b, a third controllable tunnel wall 204c, and a fourth controllable tunnel wall 204d. The controllable tunnel structure 201 further includes a signal feed 203 for receiving a millimeter wave signal, which is guided along a waveguide 205 provided by the controllable tunnel structure 201.

In certain implementations, the signal feed 203 receives a millimeter wave transmit signal, and the waveguide 205 guides the millimeter wave transit signal to an antenna for wireless transmission. In one example, the antenna is a patch antenna. In another example, the antenna is an edge fire antenna, and the combination of the edge fire antenna with the controllable tunnel structure 201 provides a tunable edge fire antenna structure.

In accordance with the teachings herein, the waveguide 205 is controlled (for instance, in shape, direction, and/or other characteristics) by a plurality of controllable tunnel walls. Such control can be provided by one or more cavity control signals (CAVITY_CTL) provided by the control circuit 202.

The controllable tunnel structure 201 includes controllable cavity walls that can either block or be transparent to (for example, pass) the millimeter wave signal based on the state of the one or more cavity control signals (CAVITY_CTL). When the wall is blocking, the wall is referred to herein as being in a blocking state. When the wall is transparent, the wall is referred to herein as being in a passing or transparent state. For example, in the illustrated embodiment, the first controllable tunnel wall 204a is set to be blocking, the second controllable tunnel wall 204b is set to be blocking, the third controllable tunnel wall 204c is set to be blocking, and the fourth controllable tunnel wall 204d is set to be transparent.

In certain implementations, the control circuit 202 individually controls each of the controllable walls of the controllable tunnel structure 201 to either block or be transparent, thereby providing tuning to form cavity tunnels. In one embodiment, the controllable tunnel structure 201 is formed using digital light processing (DLP) technology.

Figure 5B:
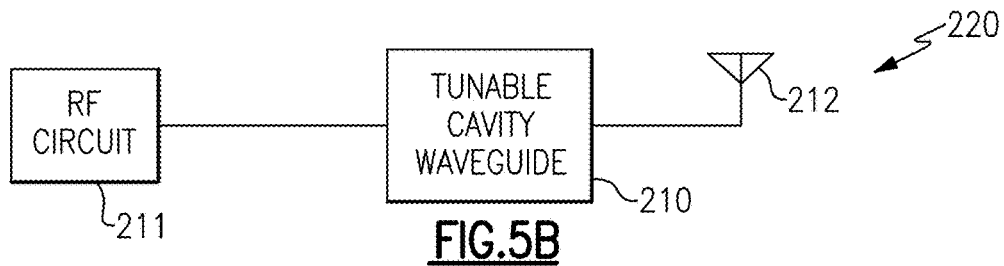
FIG. 5B is a schematic diagram of one embodiment of an RF system with a tunable cavity waveguide.

FIG. 5B is a schematic diagram of one embodiment of an RF system 220. The RF system 220 includes an RF circuit 211, a tunable cavity waveguide 210, and an antenna 212. As shown in FIG. 5B, the tunable cavity waveguide 210 guides an RF transmit signal from the RF circuit 211 to the antenna 212 and/or guides an RF receive signal from the antenna 212 to the RF circuit 211.

The RF signals handled by the cavity waveguides herein can be millimeter wave signals, such as FR2 signals. Table 1 below depicts various examples of 5G frequency bands that can correspond to the frequency band of an RF signal handled by a tunable cavity waveguide. Although various examples of frequency bands have been described, other examples are possible.

TABLE 1

| 5G Frequency Band | Band Duplex Type | UL/DL Low [MHz] | UL/DL High [MHz] |
| --- | --- | --- | --- |
| n257 | TDD | 26500 | 29500 |
| n258 | TDD | 24250 | 27500 |
| n259 | TDD | 39500 | 43500 |
| n260 | TDD | 37000 | 40000 |
| n261 | TDD | 27500 | 28350 |
| n262 | TDD | 47200 | 48200 |
| n263 | TDD | 57000 | 71000 |

Figure 5C:
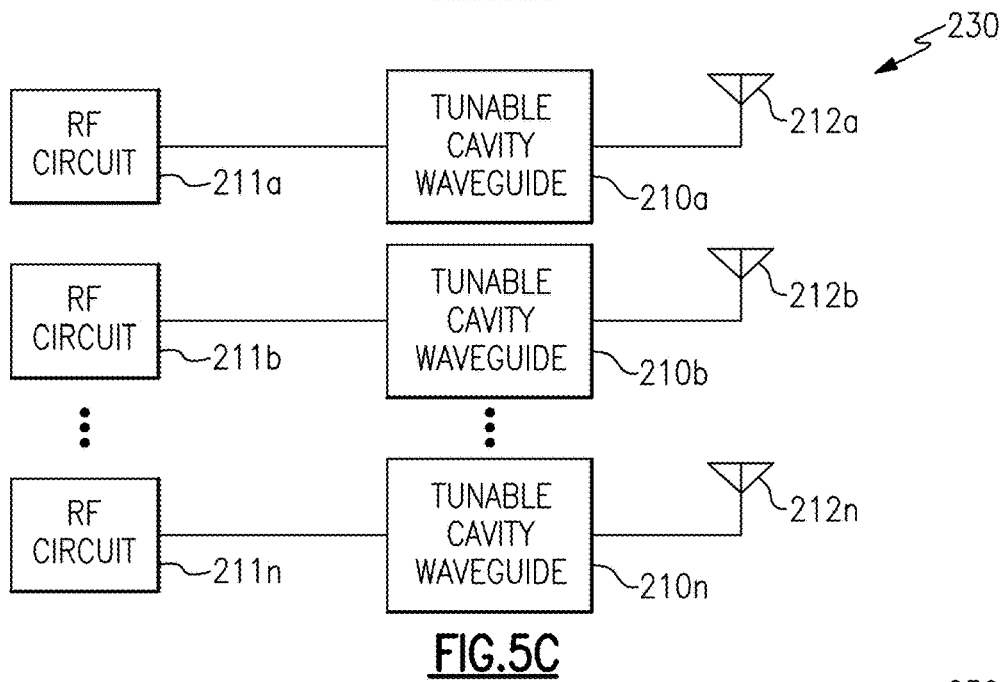
FIG. 5C is a schematic diagram of another embodiment of an RF system with tunable cavity waveguides.

FIG. 5C is a schematic diagram of another embodiment of an RF system 230. The RF system 230 includes RF circuits 211a, 211b, . . . 211n, tunable cavity waveguides 210a, 210b, 210n, and antennas 212a, 212b, . . . 212n.

The RF system 230 of FIG. 5C is similar to the RF system 220 of FIG. 5B, except that the RF system 230 includes n RF signal channels, where n is an integer greater than or equal to 2. Thus, multiple RF signals can be transmitted or received using the RF system 230 of FIG. 5C, thereby facilitating applications such as beamforming.

Figure 5D:
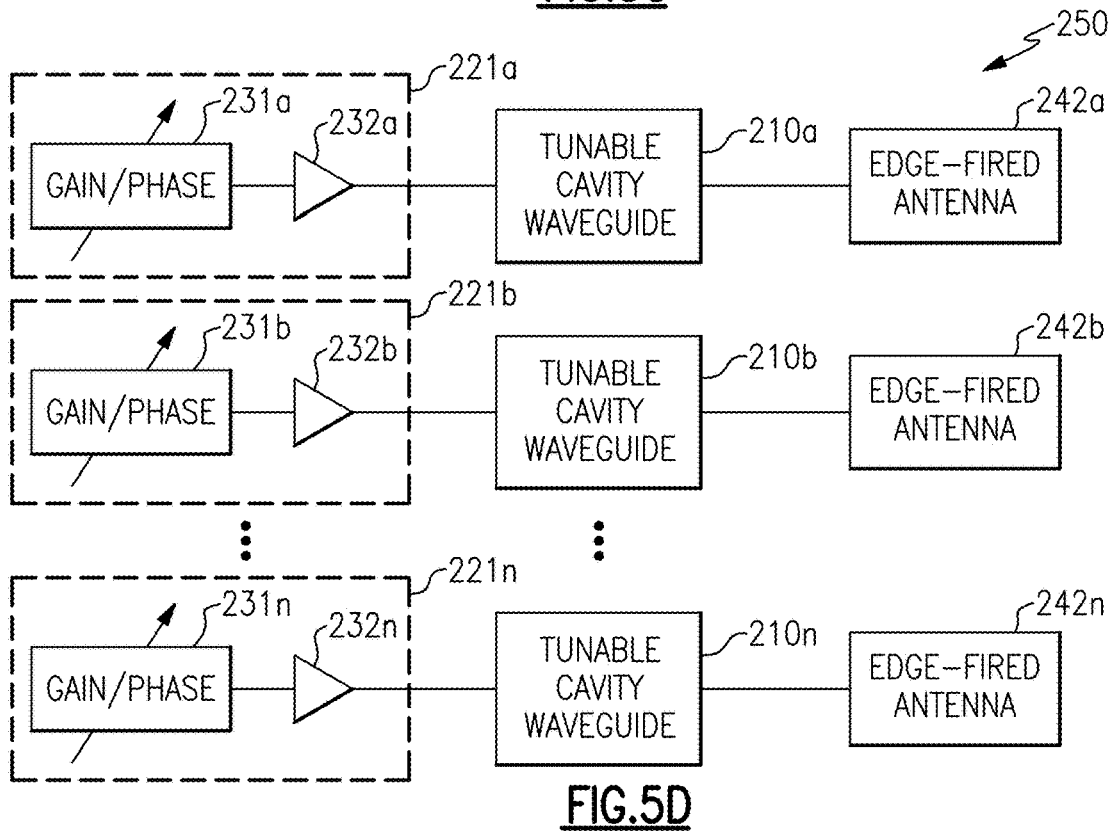
FIG. 5D is a schematic diagram of another embodiment of an RF system with tunable cavity waveguides.

FIG. 5D is a schematic diagram of another embodiment of an RF system 250 with tunable cavity waveguides. The RF system 250 includes RF circuits 221a, 221b, 221n, tunable cavity waveguides 210a, 210b, 210n, and edge-fired antennas 242a, 242b, 242n.

The RF system 250 of FIG. 5D is similar to the RF system 230 of FIG. 5C, except that the RF system 250 of FIG. 5D includes a specific implementation of an antenna array in which edge-fired antennas are used as antenna elements. Such edge-fired antennas can be formed along an edge of a module. The RF system 250 of FIG. 5D also includes a specific implementation of RF circuits 221a, 221b, . . . 221n. As shown in FIG. 5D, the RF circuits 221a, 221b, . . . 221n include controllable gain and phase circuits 231a, 231b, . . . 231n and power amplifiers 232a, 232b, 232n to support beamforming of a transmit beam that is transmitted on the edge-fired antenna array.

Figure 6A:
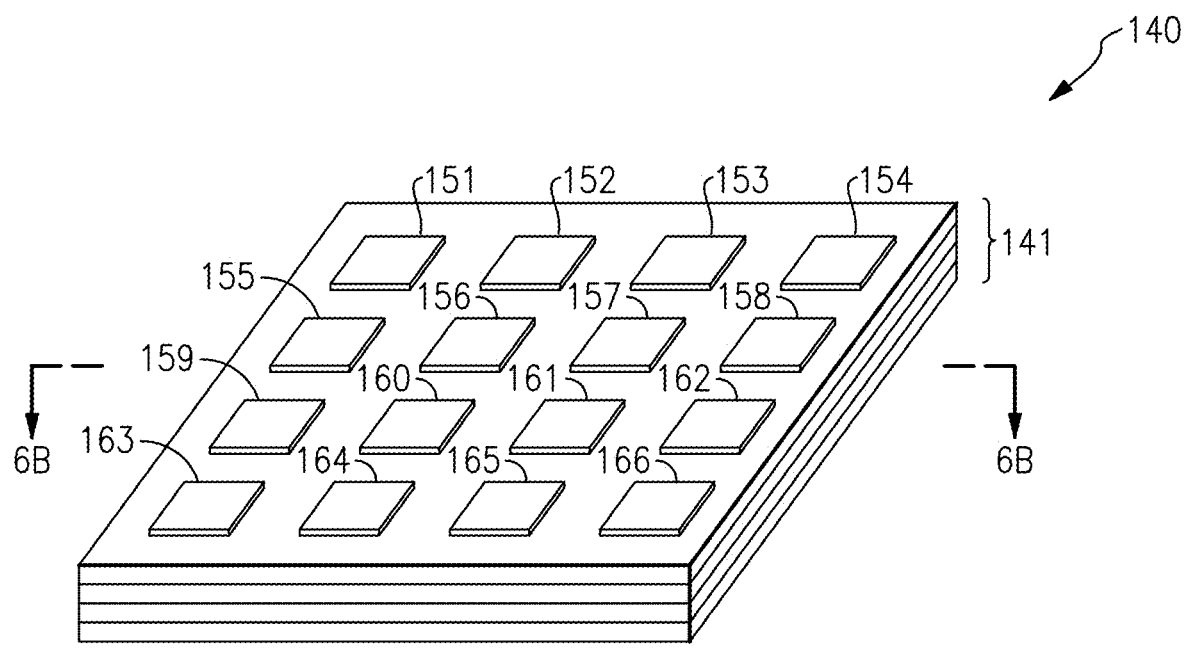
FIG. 6A is a perspective view of one embodiment of a module that operates with beamforming.
Figure 6B:
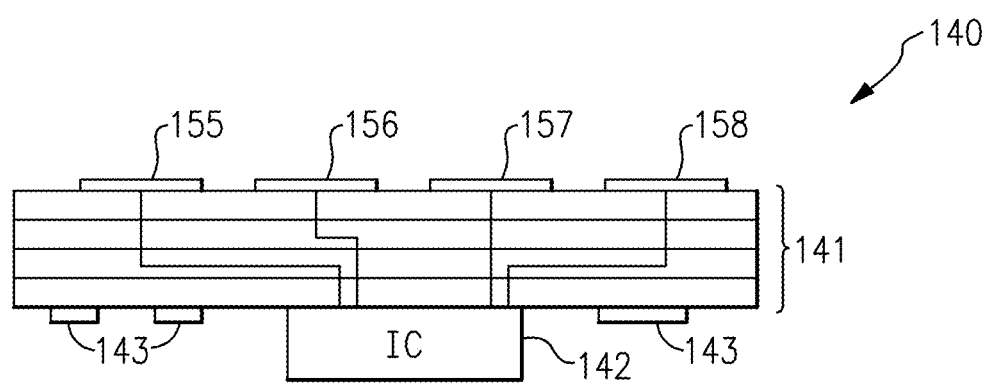
FIG. 6B is a cross-section of the module of FIG. 6A taken along the lines 6B-6B.

FIG. 6A is a perspective view of one embodiment of a module 140 that operates with beamforming. FIG. 6B is a cross-section of the module 140 of FIG. 6A taken along the lines 6B-6B.

The module 140 includes a laminated substrate or laminate 141, a semiconductor die or IC 142, surface mount components 143, and an antenna array including patch antenna elements 151-166.

Although one embodiment of a module is shown in FIGS. 6A and 6B, the teachings herein are applicable to modules implemented in a wide variety of ways. For example, a module can include a different arrangement of and/or number of antenna elements, dies, and/or surface mount components. Additionally, the module 140 can include additional structures and components including, but not limited to, encapsulation structures, shielding structures, and/or wirebonds.

In the illustrated embodiment, the antenna elements 151-166 are formed on a first surface of the laminate 141, and can be used to transmit signals, to receive signals, or to both transmit and receive signals. Although the illustrated antenna elements 151-166 are rectangular, the antenna elements 151-166 can be shaped in other ways. Additionally, although a 4×4 array of antenna elements is shown, more or fewer antenna elements can be provided. Moreover, antenna elements can be arrayed in other patterns or configurations. Furthermore, in another embodiment, multiple antenna arrays are provided, such as separate antenna arrays for transmit and receive and/or multiple antenna arrays for MIMO and/or switched diversity.

In certain implementations, the antenna elements 151-166 are implemented as patch antennas. A patch antenna can include a planar antenna element positioned over a ground plane. A patch antenna can have a relatively thin profile and exhibit robust mechanical strength. In certain configurations, the antenna elements 151-166 are implemented as patch antennas with planar antenna elements formed on the first surface of the laminate 141 and the ground plane formed using an internal conductive layer of the laminate 141.

Although an example with patch antennas is shown, a modulate can include any suitable antenna elements, including, but not limited to, patch antennas, dipole antennas, ceramic resonators, stamped metal antennas, and/or laser direct structuring antennas.

In the illustrated embodiment, the IC 142 and the surface mount components 143 are on a second surface of the laminate 141 opposite the first surface.

The IC 142 includes signal conditioning circuits associated with the antenna elements 151-166.

In certain implementations, the IC 142 includes a serial interface, such as a mobile industry processor interface radio frequency front-end (MIPI RFFE) bus and/or inter-integrated circuit (I²C) bus that receives data for controlling the signal conditioning circuits, such as the amount of phase shifting provided by phase shifters. In another embodiment, the IC 142 includes signal conditioning circuits associated with the antenna elements 151-166 and an integrated transceiver.

The module 140 can be implemented with one or more tunable cavity waveguides in accordance with the teachings herein. For example, a tunable cavity waveguide can be included between each of the antenna elements 151-166 and a corresponding signal conditioning circuit formed on the IC 142.

The laminate 141 can be implemented in a variety of ways, and can include for example, conductive layers, dielectric layers, solder masks, and/or other structures. The number of layers, layer thicknesses, and materials used to form the layers can be selected based on a wide variety of factors, which can vary with application. The laminate 141 can include vias for providing electrical connections to signal feeds and/or ground feeds of the antenna elements 151-166. For example, in certain implementations, vias can aid in providing electrical connections between signaling conditioning circuits of the IC 142 and corresponding antenna elements.

The module 140 can be included in a communication system, such as a mobile phone or base station. In one example, the module 140 is attached to a phone board of a mobile phone.

Figure 7:
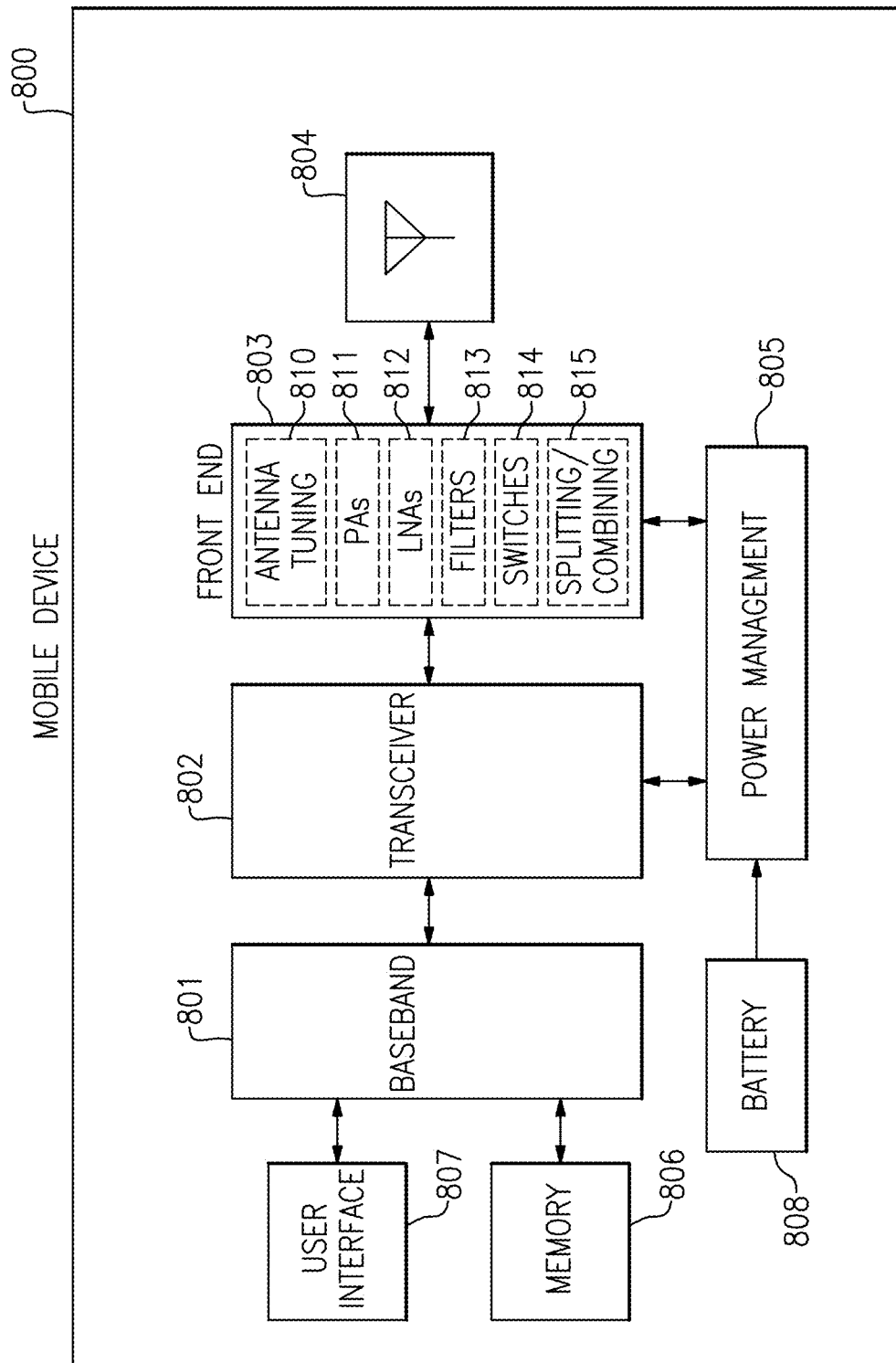
FIG. 7 is a schematic diagram of one embodiment of a mobile device.

FIG. 7 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 7 as the transceiver 802. In one example, separate components (for instance, separate circuits or dies) can be provided for handling certain types of RF signals.

The front end system 803 aids in conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

The front end system 803 can include one or more tunable cavity filters implemented in accordance with the teachings herein. For example, the tunable cavity filters can be used to guide millimeter wave signals between components of the front end and/or from components of the front end to the antennas 804.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 7, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 7, the power management system 805 receives a battery voltage from the battery 808. The battery 808 can be any suitable battery for use in the mobile device 800, including, for example, a lithium-ion battery.

Figure 8A:
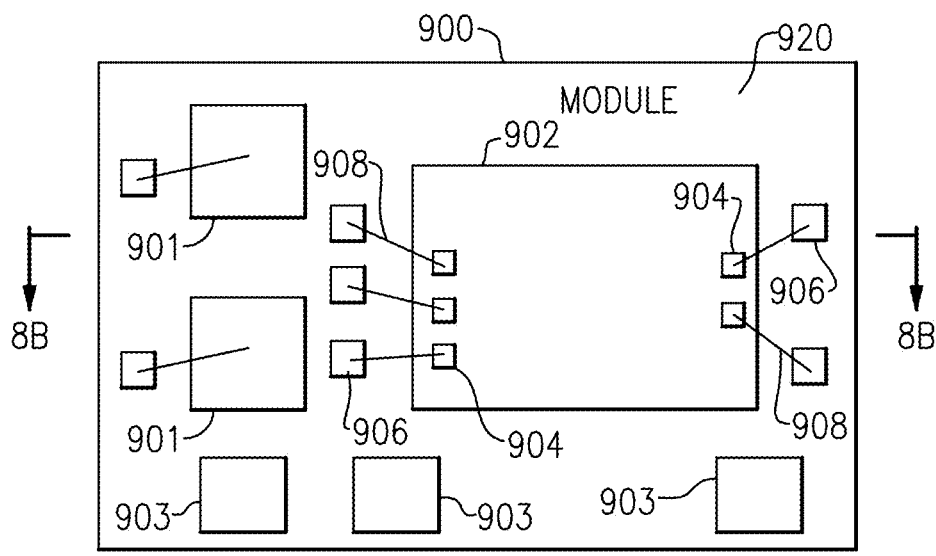
FIG. 8A is a schematic diagram of one embodiment of a packaged module.
Figure 8B:
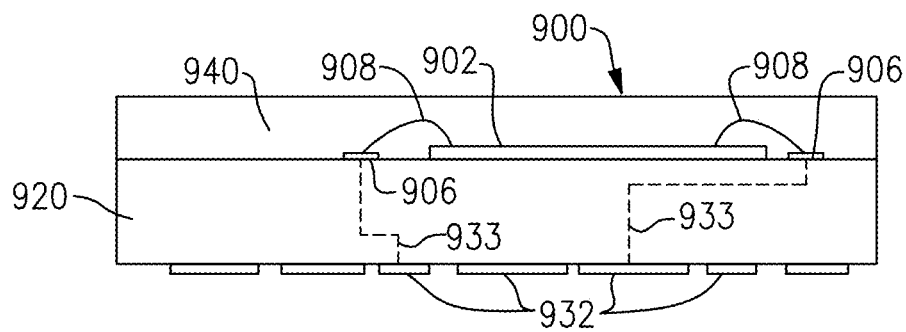
FIG. 8B is a schematic diagram of a cross-section of the packaged module of FIG. 8A taken along the lines 8B-8B.

FIG. 8A is a schematic diagram of one embodiment of a packaged module 900. FIG. 8B is a schematic diagram of a cross-section of the packaged module 900 of FIG. 8A taken along the lines 8B-8B.

The packaged module 900 includes radio frequency components 901, a semiconductor die 902, surface mount devices 903, wirebonds 908, a package substrate 920, and an encapsulation structure 940. The package substrate 920 includes pads 906 formed from conductors disposed therein. Additionally, the semiconductor die 902 includes pins or pads 904, and the wirebonds 908 have been used to connect the pads 904 of the die 902 to the pads 906 of the package substrate 920.

The packaging substrate 920 can be configured to receive a plurality of components such as radio frequency components 901, the semiconductor die 902 and the surface mount devices 903, which can include, for example, surface mount capacitors and/or inductors. In one implementation, the radio frequency components 901 include integrated passive devices (IPDs).

As shown in FIG. 8B, the packaged module 900 is shown to include a plurality of contact pads 932 disposed on the side of the packaged module 900 opposite the side used to mount the semiconductor die 902. Configuring the packaged module 900 in this manner can aid in connecting the packaged module 900 to a circuit board, such as a phone board of a mobile device. The example contact pads 932 can be configured to provide radio frequency signals, bias signals, and/or power (for example, a power supply voltage and ground) to the semiconductor die 902 and/or other components. As shown in FIG. 8B, the electrical connections between the contact pads 932 and the semiconductor die 902 can be facilitated by connections 933 through the package substrate 920. The connections 933 can represent electrical paths formed through the package substrate 920, such as connections associated with vias and conductors of a multilayer laminated package substrate.

The packaged module 900 can include one or more tunable cavity waveguides implemented in accordance with the teachings herein. For example, the tunable cavity waveguides can be used to guide millimeter wave signals between RF circuits formed on the semiconductor die 902 and antennas formed on or connected to packaged module 900.

In some embodiments, the packaged module 900 can also include one or more packaging structures to, for example, provide protection and/or facilitate handling. Such a packaging structure can include overmold or encapsulation structure 940 formed over the packaging substrate 920 and the components and die(s) disposed thereon.

It will be understood that although the packaged module 900 is described in the context of electrical connections based on wirebonds, one or more features of the present disclosure can also be implemented in other packaging configurations, including, for example, flip-chip configurations.

Figure 9A:
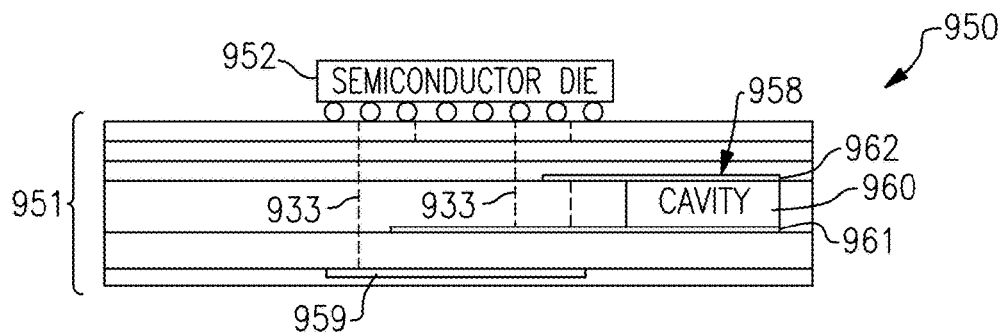
FIG. 9A is a schematic diagram of a cross-section of another embodiment of a packaged module.

FIG. 9A is a schematic diagram of a cross-section of another embodiment of a packaged module 950. The packaged module 950 includes a laminated package substrate 951 and a flip-chip die 952.

The laminated package substrate 951 includes a cavity-based antenna 958 associated with an air cavity 960, a first conductor 961, a second conductor 962. The laminated package substrate 951 further includes a planar antenna 959.

In certain implementations herein, a packaged module includes one or more integrated antennas. For example, the packaged module 950 of FIG. 9A includes the cavity-based antenna 958 and the planar antenna 959. By including antennas facing in multiple directions (including, but not limited to, directions that are substantially perpendicular to one another), a range of available angles for communications can be increased. Although one example of a packaged module with integrated antennas is shown, the teachings herein are applicable to modules implemented in a wide variety of ways.

Figure 9B:
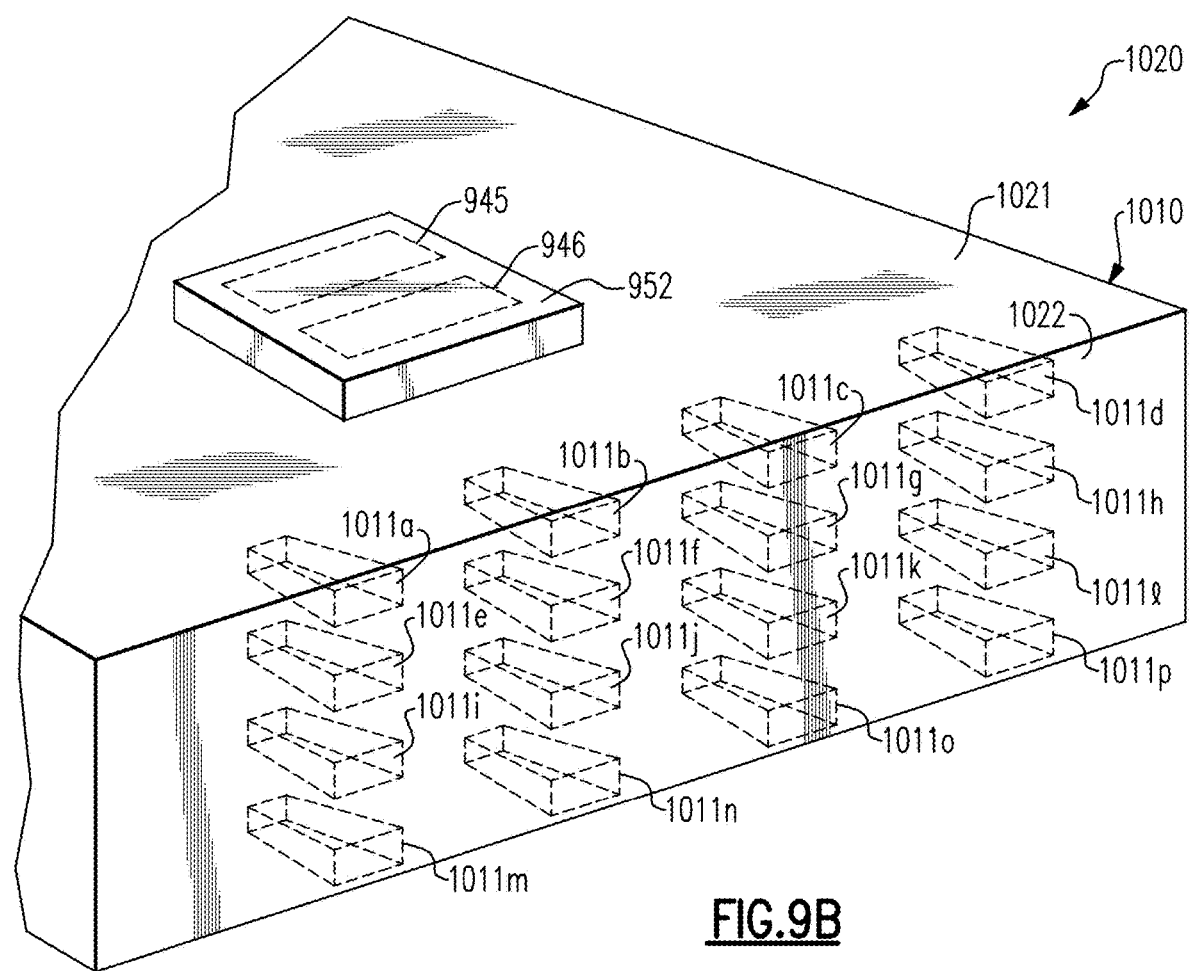
FIG. 9B is a perspective view of another embodiment of a packaged module.

FIG. 9B is a perspective view of another embodiment of a packaged module 1020. The module 1020 includes a laminated substrate 1010 and a semiconductor die 1012. In certain implementations, the semiconductor die 1012 includes RF circuitry 945 (such as power amplifiers or other signal conditioning circuits) and a tunable waveguide control circuit 946. Additionally, the laminated substrate 1010 is implemented with one or more tunable cavity filters in accordance with the teachings herein.

In the illustrated the embodiment, cavity-based antennas 1011a-1011p have been formed on an edge 1022 of the laminated substrate 1010. In this example, sixteen cavity-based antennas have been provided in a four-by-four (4×4) array. However, more or fewer antennas can be included and/or antennas can be arrayed in other patterns.

In another embodiment, the laminated substrate 1010 further include another antenna array (for example, a patch antenna array) formed on a second major surface of the laminated substrate 1010 opposite the first major surface 1021. Implementing the module 1020 aids in increasing a range of angles over which the module 1020 can communicate.

The module 1020 illustrates another embodiment of a module including an array of antennas that are controllable to provide beamforming. Implementing an array of antennas on a side of module aids in communicating at certain angles and/or directions that may otherwise be unavailable due to environmental blockage. Although an example with cavity-based antennas is shown, the teachings herein are applicable to implementations using other types of antennas.

The module 1020 can include one or more tunable cavity waveguides implemented in accordance with the teachings herein. For example, the tunable cavity waveguides can be used to guide millimeter wave signals between the RF circuitry 945 formed on the semiconductor die 952 and the cavity-based antennas 1011a-1011p. Additionally, the tunable cavity waveguides can be controlled by the tunable waveguide control circuit 946 formed on the semiconductor die 952.

Applications

Some of the embodiments described above have provided examples in connection with wireless devices or mobile phones. However, the principles and advantages of the embodiments can be used for any other systems or apparatus that have needs for tunable cavity waveguides.

For example, the teachings herein can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
an antenna; and
a front end system including a radio frequency circuit configured to generate a millimeter wave signal, a controllable tunnel structure having a signal feed configured to receive the millimeter wave signal, and a plurality of controllable tunnel walls providing a waveguide for the millimeter wave signal to the antenna, the front end system further including a control circuit configured to control the waveguide by individually setting each of the plurality of controllable tunnel walls in a blocking state in which the millimeter wave signal is blocked or a transparent state in which the millimeter wave signal is passed.

2. The mobile device of claim 1 wherein the plurality of controllable tunnel walls includes a first controllable tunnel wall on a first side of the signal feed, a second controllable tunnel wall on a second side of the signal feed, a third controllable tunnel wall on a third side of the signal feed, and a fourth controllable tunnel wall on a fourth side of the signal feed.

3. The mobile device of claim 2 wherein the control circuit is configured to set the first controllable tunnel wall to the transparent state.

4. The mobile device of claim 3 wherein the control circuit is further configured to set the second controllable tunable wall, the third controllable tunnel wall, and the fourth controllable tunnel wall to the blocking state.

5. The mobile device of claim 1 wherein the radio frequency circuit includes a power amplifier configured to provide the millimeter wave signal at an output.

6. The mobile device of claim 1 wherein the millimeter wave signal is in frequency range two of fifth generation.

7. The mobile device of claim 1 further comprising a substrate to which the antenna is attached.

8. The mobile device of claim 7 further comprising a semiconductor die attached to the substrate, the semiconductor die including the radio frequency circuit and the control circuit.

9. The mobile device of claim 7 wherein the antenna is an edge-fired antenna formed on an edge of the substrate.

10. The mobile device of claim 7 wherein the antenna is a patch antenna formed on a major surface of the substrate.

11. The mobile device of claim 1 further comprising an antenna array operable to radiate a transmit beam, the antenna array including the antenna.

12. A tunable cavity waveguide comprising:
a controllable tunnel structure including a signal feed configured to receive a millimeter wave signal, and a plurality of controllable tunnel walls providing a waveguide for the millimeter wave signal; and
a control circuit configured to control the waveguide by individually setting each of the plurality of controllable tunnel walls in a blocking state in which the millimeter wave signal is blocked or a transparent state in which the millimeter wave signal is passed.

13. The tunable cavity waveguide of claim 12 wherein the plurality of controllable tunnel walls includes a first controllable tunnel wall on a first side of the signal feed, a second controllable tunnel wall on a second side of the signal feed, a third controllable tunnel wall on a third side of the signal feed, and a fourth controllable tunnel wall on a fourth side of the signal feed.

14. The tunable cavity waveguide of claim 12 wherein the controllable tunnel structure is integrated with an edge-fired antenna.

15. The tunable cavity waveguide of claim 12 wherein the millimeter wave signal is in frequency range two of fifth generation.

16. A method of signal transmission in a mobile device, the method comprising:
generating a millimeter wave signal using a radio frequency circuit;
providing the millimeter wave signal to a signal feed of a controllable tunnel structure;
providing a wave guide from the signal feed to the antenna through the controllable tunnel structure by individually setting each of the plurality of controllable tunnel walls in a blocking state in which the millimeter wave signal is blocked or a transparent state in which the millimeter wave signal is passed.

17. The method of claim 16 wherein the plurality of controllable tunnel walls includes a first controllable tunnel wall on a first side of the signal feed, a second controllable tunnel wall on a second side of the signal feed, a third controllable tunnel wall on a third side of the signal feed, and a fourth controllable tunnel wall on a fourth side of the signal feed, the method further comprising setting the first controllable tunnel wall to the transparent state.

18. The method of claim 17 further comprising setting the second controllable tunable wall, the third controllable tunnel wall, and the fourth controllable tunnel wall to the blocking state.

19. The method of claim 16 further comprising providing the millimeter wave signal at an output of a power amplifier.

20. The method of claim 16 further comprising radiating a transmit beam from an edge-fired antenna array formed on an edge of a substrate, the edge-fired antenna array including the antenna.

* * * * *